United States Patent [19]

Montalvo et al.

[11] Patent Number: 5,370,495
[45] Date of Patent: Dec. 6, 1994

[54] APPARATUS FOR PROTECTING THE EXTERIOR OF STACKED DISKS

[76] Inventors: Samuel A. Montalvo, 1033 Arlington La., San Jose, Calif. 95129; Phillip J. Kronzer, 16441 S. Kennedy Rd., Los Gatos, Calif. 95032

[21] Appl. No.: 22,996

[22] Filed: Feb. 26, 1993

[51] Int. Cl.⁵ .............................................. B65G 59/06
[52] U.S. Cl. ................................. 414/797.9; 221/93
[58] Field of Search ...................... 221/93, 95, 123; 414/797.9

[56] References Cited

U.S. PATENT DOCUMENTS

| | | | |
|---|---|---|---|
| 2,333,176 | 11/1943 | Hoban | 221/93 X |
| 3,300,087 | 1/1967 | Kuypers | 221/93 |
| 4,271,980 | 6/1981 | Frieser et al. | 221/297 |
| 4,497,604 | 2/1985 | Sabatino et al. | 221/93 X |
| 4,646,178 | 2/1987 | Garratt et al. | 360/98 |
| 4,693,659 | 9/1987 | Burke et al. | |
| 4,718,808 | 1/1988 | Hoshino et al. | 414/797.9 X |
| 4,813,838 | 3/1989 | Santeusanio | 414/798.1 |

Primary Examiner—Michael S. Huppert
Assistant Examiner—Janice L. Krizek
Attorney, Agent, or Firm—Schneck & McHugh

[57] ABSTRACT

An apparatus for sequentially releasing computer disks from a stack includes a hopper and a pusher member for sliding a lowermost disk from beneath the stack. A next lowermost disk is held at an angle to the lowermost disk to limit contact of the disks to rearward disk edges, so that sliding contact is minimized. The front edge of the next lowermost disk is supported by a sloped surface to achieve the desired angle and to allow gravitational feed of the disks as the pusher plate is unloaded by a forward disk delivery and a rearward return. At the rearward end of the next lowest disk, an inwardly sloped surface provides space for the disk to slide down the outwardly sloped surface into the loaded position. Preferably, the hopper is one of a number of hoppers used in collating computer disks.

17 Claims, 5 Drawing Sheets

APPARATUS FOR PROTECTING THE EXTERIOR OF STACKED DISKS

DESCRIPTION

1. Technical Field

The present invention relates generally to apparatus for automated handling and dispensing devices for computer disks and more particularly to dispensing individual disks.

2. Background Art

Often in the purchase of computer software, such as a word processing program, the software is contained on a multi-disk set of prerecorded magnetic disks. The magnetic disks are commonly referred to as floppy disks and are contained within protective jackets. Standard sizes are 5.25 inches and 3.5 inches.

Typically, a duplicator prerecords the information on the disks, with each separate portion in a multidisk set being mass produced separately. For example, in a six-disk set, the six portions are separately recorded on the different disks. As a result, there are six stacks of disks. Disks must then be collated to form complete sets for packaging and sale.

The conventional method of collating is to hand sort the disks, since both the 5.25-inch disks and the 3.5-inch disks are packaged in manners that create handling difficulties. The difficulty with handling 5.25-inch disks is that they are typically inserted into sleeves having a number of edges and folds that increase the susceptibility of automated handling devices to jamming. A 3.5-inch disk is contained within a housing having a sliding metallic shutter that is used to cover a window to the magnetic material when the disk is not in use. The metallic shutters may become scratched when two 3.5-inch disks are caused to slide against one another. While the scratches do not adversely affect operation, disks having scratched shutters are typically outside of quality control standards, since a scratch does affect marketability. Therefore, the scratching reduces the manufacturing yield of the process.

With regard to 3.5-inch disks, U.S. Pat. No. 4,813,838 to Santeusanio describes an automated loading device in which the disks are dropped from a stack. The device incorporates only a small amount of shutter-to-shutter sliding, but requires the cooperation of various moving components in order to achieve singularization of disks. At one side of the disk stack is a solenoid-and-plunger arrangement that applies pressure to lower disks in the stack. At the opposite side is a pivoting kicker plate that releases a lowermost disk, while a fixed rubber member holds the disks above the lowermost disk. The required cooperation of the various components renders the device susceptible to periodic breakdowns.

It is an object of the present invention provide an apparatus for reliable automated handling of computer disks that are susceptible to scratches and the like.

SUMMARY OF THE INVENTION

The above object has been met by an apparatus for sequentially releasing computer disks, wherein contact between the two lowest disks in a stack is limited to a single line of contact in order to prevent the disks from damaging one another when relative movement is initiated. The structure for ensuring only the single line of contact is a passive structure, so that the required cooperation between moving parts of the apparatus is minimized.

In a preferred embodiment, the stack is held in a hopper having a front wall and a rear wall. A pusher plate has an opening that is aligned with the hopper to receive a lowermost disk. Collating is achieved by employing a number of hoppers, with the pusher plate having a corresponding number of openings. The openings define disk-receiving areas. Sliding the pusher plate forwardly slides the disks from below the hoppers for ordered, but simultaneous, release onto a conveyor belt or the like.

At the forward wall of each hopper is a stationary sloped surface that extends into the stack slightly above the disk that is in the disk-receiving area. The sloped surface supports one end of a second lowermost disk, while the opposite end rests on the lowermost disk along the single line of contact. The single line of contact is at the rearward edge of the two disks, so that when the pusher plate is moved forwardly only a small degree of disk-to-disk sliding occurs. The two disks are at angles to each other, so that metal shutters or the like on the disks are not allowed to slide against each other.

The rearward wall of each hopper has an inward slope that facilitates a gravitational feed of a disk into the disk-receiving area. The pusher plate moves relative to the hopper into a forward, delivery position, whereupon the single line of contact is along the Lop surface of the pusher plate. Return of the disk-receiving area to alignment with the hopper allows the stack to press a disk into the now empty disk-receiving area.

Preferably, the sloped surfaces of the front and rear walls of each hopper have a height that is less than the height of a disk. The slopes of the surfaces should be designed to ensure a reliable gravity feed from the stack.

An advantage of the present invention is that the apparatus automates computer disk collation. The automated handling is achieved with a minimum number of working components, while being able to provide a desired separation between a lowermost disk and a second lowermost disk.

BEST MODE FOR CARRYING OUT THE INVENTION

Figure 1:
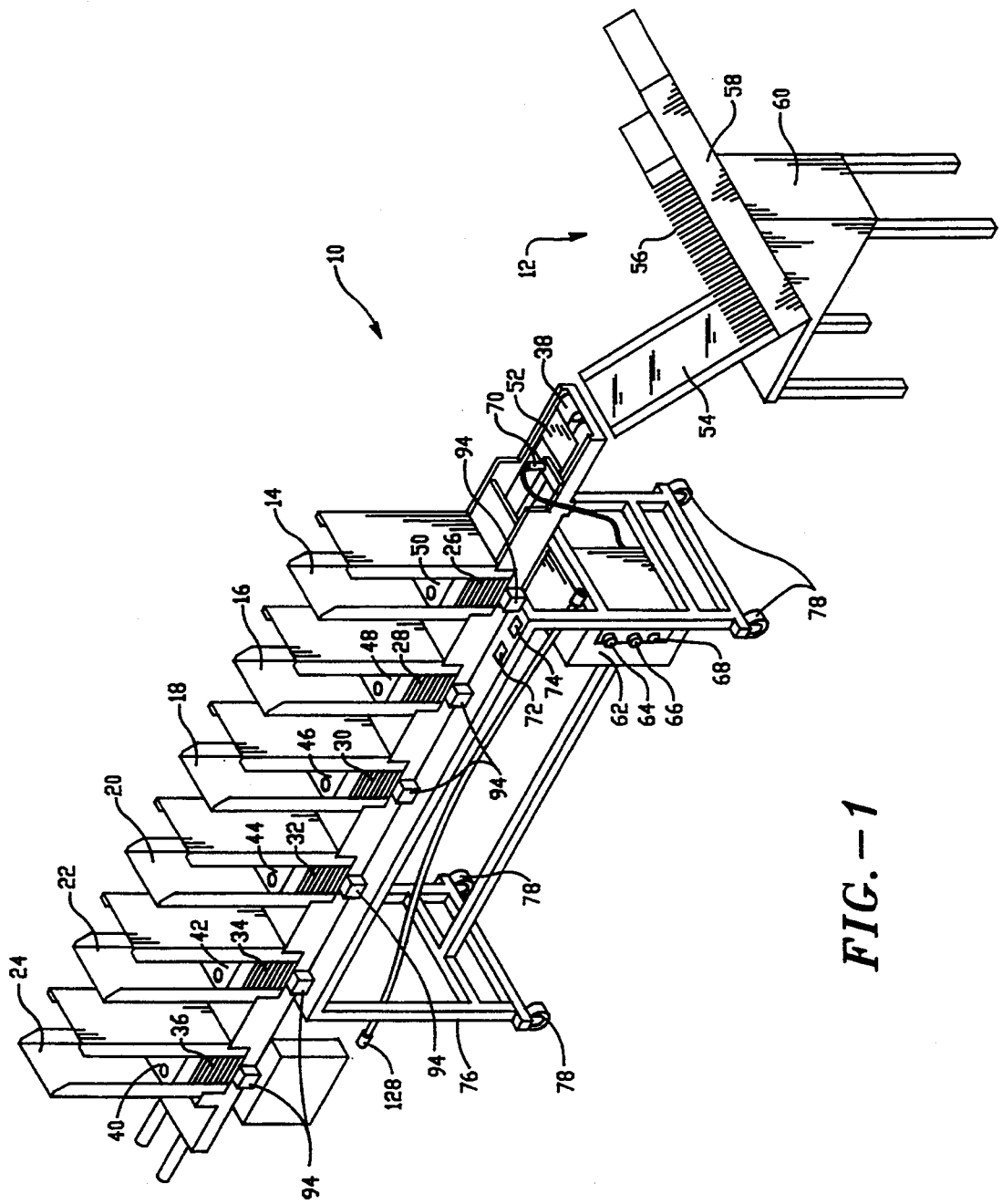
FIG. 1 is a perspective view of a collation apparatus and a stacker member in accordance with the present invention.

With reference to FIG. 1, a collating apparatus 10 is shown with a disk stacker 12. The collating apparatus includes six hoppers 14, 16, 18, 20, 22 and 24. Each hopper contains a stack 26, 28, 30, 32, 34 and 36 of floppy disks. All of the disks within a particular stack are identical, but information on the disks of stack 26 is different than information contained on disks within the other stacks. For example, the stacks 26–36 may be the six different disks of a word processing program.

As will be explained more fully below, the first disk of a complete set is contained within the first hopper 14, while the last disk is contained within the sixth hopper 24. For sets less than six, no special setup is necessary other than to set the appropriate number at a disk counter which will be described below. Rather, the appropriate number of hoppers is left empty. If instead the set is greater than six, a second collating apparatus, not shown, can be connected to the one shown in FIG. 1. An endless conveyor belt 38 carries the individual floppy disks to the stacker 12. Optionally, the conveyor belt may be a series of O-rings that are sufficiently closely spaced to support the disks. The apparatus is structured such that the conveyor belt of a second collating apparatus delivers its disks to the conveyor belt 38 of the collating apparatus 10. That is, the apparatus is a modular unit.

Atop each disk stack 36–26 is a load member 40, 42, 44, 46, 48 and 50. The load member provides compression to ensure proper positioning of the lowermost disk in a stack. The lowermost disk is held flat during the release process. The release process is one that utilizes a pusher plate, not shown, to simultaneously slide each lowermost disk in the stacks 26–36 forwardly from beneath the stack. The six sliding disks reach openings that simultaneously drop the six disks onto the conveyor belt 38. The six disks then move uniformly toward the stacker 12 or some other off-loading apparatus.

FIG. 1 shows a single disk 52 immediately before the disk is gravity fed to the stacker. A disk 52 from the conveyor belt slides along a tray 54 and is inserted below a collated stack 56 of disks. A user may then remove the disks in a multi-disk set process for packaging and sale of the collated sets.

A hopper 58 on the stacker 12 collects the collated stack 56. A stand 60 properly aligns the tray 54 and the hopper 58 for collection of disks from the conveyor belt. While not shown, a piston device is used to provide room for each succeeding disk as it moves to the area below the collated stack 56. As an alternative to the stacker 12, a device may be used that positions each succeeding disk atop the stack, rather than beneath the stack. In this case, the order of the stacks 26–36 would be reversed within the hoppers 14–24, so that the first disk in the set would be in hopper 24.

Operation of the collating apparatus 10 is electronically controlled at a housing 62. The housing includes controls 64, 66 and 68 that may include a power switch, an on-off control for a disk count, a start button, and/or a potentiometer for controlling the speed of the conveyor belt 38. A disk count is achieved by use of an infrared detector system. The system includes a light source 70 that directs a beam downwardly through a split in the conveyor belt 38. A photodetector, not shown, on the opposite side of the conveyor belt is aligned to receive the light energy from the source 70. Interruption of the path from the source 70 to the photodetector by a disk 52 triggers a count of the disk. The above-described infrared detector system is not critical to proper operation of the collating apparatus. Light detection outside of the infrared bandwidth is possible and, in fact, sound waves may be utilized in the detector system. Moreover, rather than a system in which wave energy is directed from a source to a receptor, a reflected or diffused detector system may be used.

The apparatus 10 includes two counters 72 and 74. The first counter 72 is selectively adjusted for the number of disk stacks 26–36. As noted above, the number may be less than the six shown in FIG. 1 or can be greater if a second collating apparatus is connected to the illustrated master collating apparatus. The second counter 74 is set for the number of desired sets. For example, where thirty-six sets of six disks are desired the counters 72 and 74 are respectively set at "6" and "36". As each disk interrupts the light path from the source 70, the number indicated by the first counter 72 is decreased by one. Upon reaching zero, the second counter 74 is decreased by one. Preferably, the count is in the opposite direction, so that the movement of a disk 52 past a detection area increments the first counter upwardly by one unit. When the first counter reaches the preset number of disks in a set, the first counter returns to zero and the second counter is incrementally adjusted upwardly. Only upon the counting of all six disks within a set can the apparatus 10 be triggered to release more disks onto the conveyor belt 38. Thus, if for some reason all six disks were not released for a particular set, operation of the apparatus will cease until an operator has corrected any problem.

The collating apparatus 10 includes a support frame 76. Optionally, wheels 78 are included to facilitate connection and disconnection of one collating apparatus 10 to a second collating apparatus.

The apparatus 10 may be used to collate any size floppy disk. The disk 52 is shown as being a 5.25-inch disk having a sleeve. A problem with such a disk is that the sleeve can be wrinkled by a write-protect notch of another disk as the lowermost disk is slid from beneath a stack 26–36. Any wrinkling of a sleeve will increase the chances of a jam occurring, since a wrinkle will change the thickness of the sleeved disk. One possible solution is to employ plunger devices 94 to enter the area between a lowermost disk and a next lowest disk in order to separate the area of concern, i.e., the write-protect notch of one disk from the sleeve of another. The plunger devices may be solenoids that are selectively triggered when the lowermost disks are moved forwardly.

Figure 2:
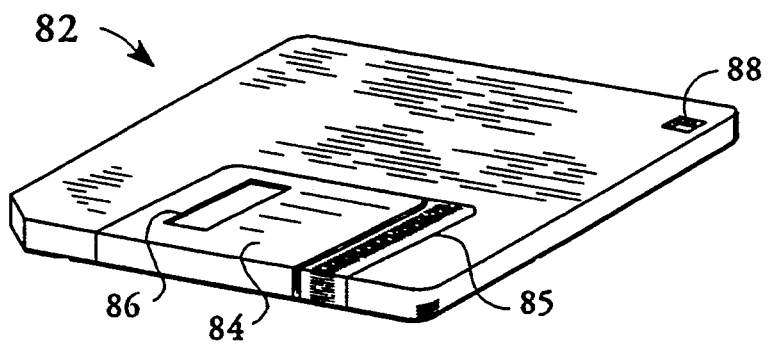
FIG. 2 is a perspective view of a 3.5-inch disk that may be used with the apparatus of FIG. 1.

Referring now to FIG. 2, a 3.5-inch disk 82 is not housed within a sleeve. However, such disks include metal shutters 84. The metal shutter 84 slides along one edge of the disk. In the position shown in FIG. 2, the shutter covers a window to the magnetic material onto which information is recorded. In use, the shutter 84 is moved to abut a stop edge 85, thereby aligning an opening 86 in the shutter with the window to the magnetic material. The disk 82 also includes a write-protect notch 88 that allows a user to prevent the recording of information onto the disk.

Figure 3:
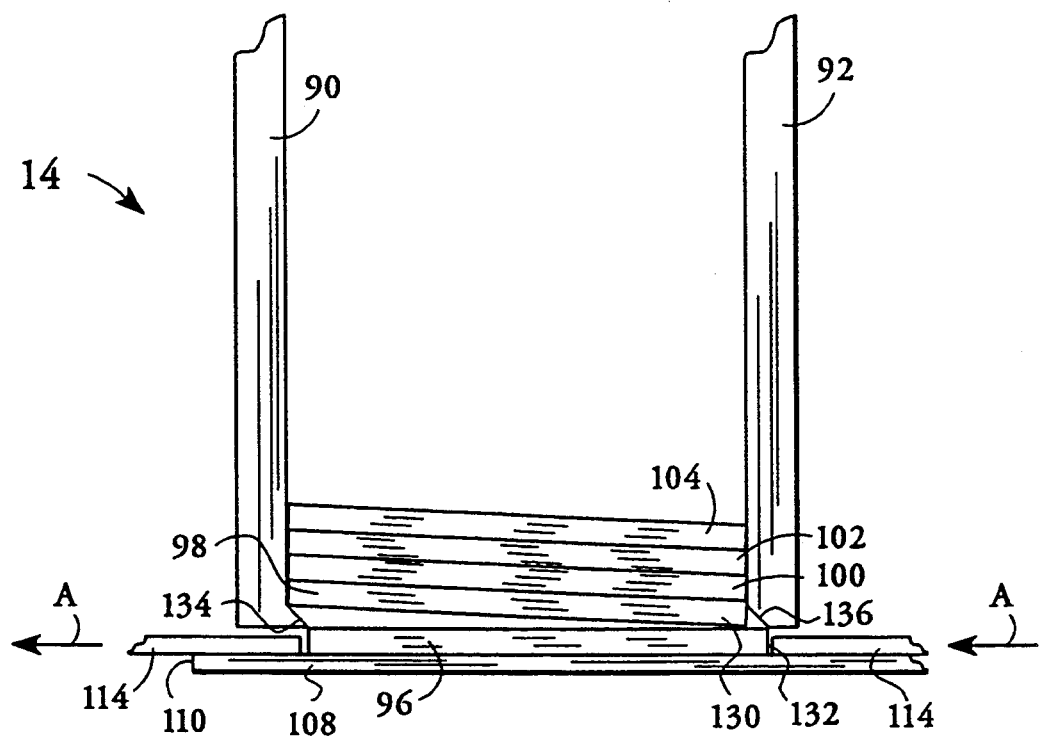
FIG. 3 is a side view of a disk-releasing apparatus of FIG. 1.

In FIG. 3, five disks 96, 98, 100, 102 and 104 are shown within a hopper 14. The hopper includes a forward wall 90 and a rearward wall 92.

The lowermost disk 96 rests on a stationary substrate 108 having a front edge 110. Also resting on the stationary substrate 108 is a slidable pusher plate 114. The lowermost disk 96 is positioned within an opening in the pusher plate. Forward movement of the pusher plate, as indicated by arrows A, moves the disk 96 beyond the edge 110 of the stationary substrate, thereby permitting the disk to fall onto the conveyor belt described above.

Ideally, there is a hierarchy of openings for the release of the disks 96–104. That is, successive openings are made progressively larger in order to eliminate disk hangup. A disk-receiving opening in the slidable pusher plate 114 is larger than the spacing between the forward and rearward walls 90 and 92 of the hopper 14. In turn, the pass-through opening that begins at the edge 110 of the stationary substrate 108 is larger than the disk-receiving opening of the pusher plate. Finally, the endless conveyor belt is larger than the pass-through opening.

Figure 4:
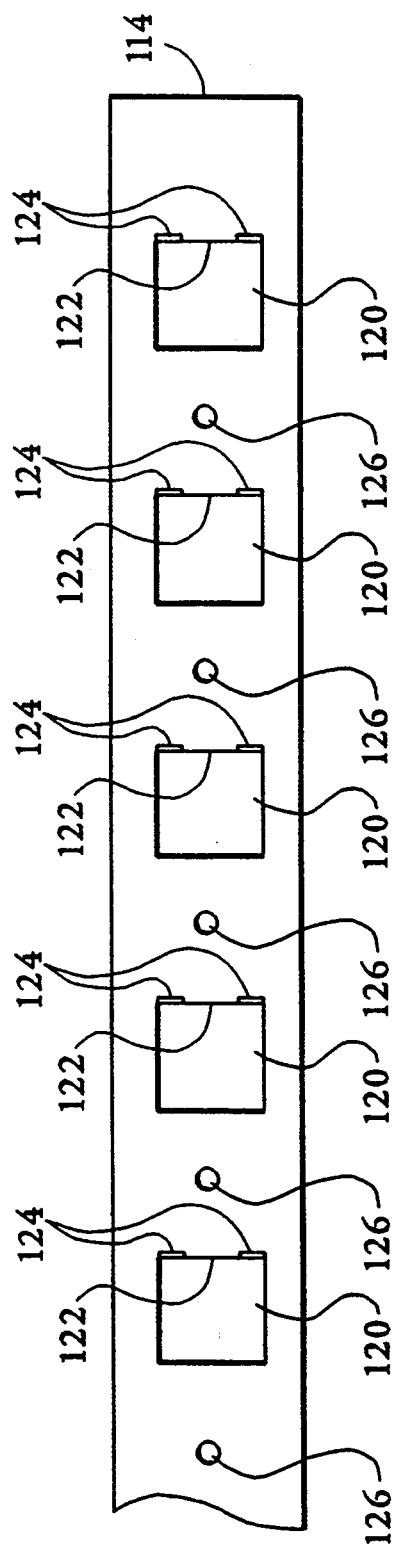
FIG. 4 is a top view of a pusher plate for sliding lowermost disks from the stacks of FIG. 1.
Figure 5:
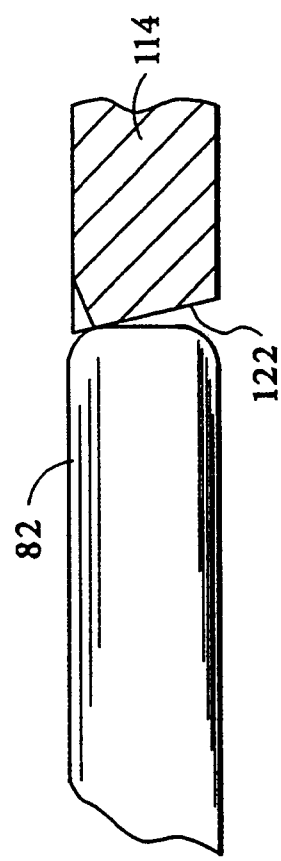
FIG. 5 is a side sectional view of the pusher plate of FIG. 4 in contact with a computer disk.

Referring to FIGS. 4 and 5, the pusher plate 114 includes a separate disk-receiving opening 120 for each hopper. In a rest position, the openings 120 are aligned with the hoppers and a single disk is gravity fed into each opening from an associated hopper. When the pusher plate 114 is moved forwardly, each disk moves forwardly along the stationary substrate for deposit onto the endless conveyor belt. For a pusher plate designed to deliver 5.25-inch disks, one edge 122 of each opening 120 is at an angle relative to the disk 82 to be released. The angling of the pushing edge 122 functions to trap the 5.25-inch disk. This reduces the possibility of the disk rising above the pusher plate to jam the apparatus. Because 3.5-inch disks are rigid, an angled edge 122 on a pusher plate for such disks is not necessary.

In comparison to the angling of the pushing edge 122, opposite ends 124 of the edge 122 should be chamfered if the pusher plate is to be used in combination with sleeved 5.25-inch disks. The chamfer is in the opposite direction of the central angling of the pushing edge 122. The chamfered ends 124 allow smooth passage of the edge 122 along a folded-over portion on the back of a sleeve that covers a 5.25-inch disk.

A last feature of the pusher plate 114 is a series of circular cuts 126 that are aligned with the pass-through openings of the stationary substrate on 10 which the pusher plate rests. The aligned circular cuts 126 and the pass-through openings provide a view of the underlying conveyor belt, so that a user can determine whether any obstructions exist along the conveyor belt.

While not shown, a pneumatic device is connected at the rearward end of the pusher plate 114. The coupling of the pneumatic device to the pusher plate provides a means for sliding the pusher plate forwardly and rearwardly as desired.

Returning to FIG. 2, a difficulty with sorting 3.5-inch disks 82 is that the metal shutters 84 can be scratched. This is particularly true if the disks in a stack are caused to slide against each other. While scratches to the shutters will not affect operation of the disks, a scratched disk is less marketable. Moreover, the metal shutter may be used to affix a manufacturer's logo to the disk. In such case, it is in the interest of the manufacturer to prevent scratching.

The arrangement of FIG. 3 minimizes movement of the disks relative to each other. Rather than sliding a lowermost disk 96 along the underside of the next lowermost disk 98, a single line of contact between the two disks is maintained near the rearward ends 130 and 132 of the disks. The next lowermost disk 98 rests at an angle to the disk 96 that is within the opening of the pusher plate 114. The forward wall 90 of the hopper has an outwardly sloped surface 134 that projects into a spacing between disk 96 and disk 98.

The next lowermost disk 98 rests at its forward end upon the outwardly sloped surface 134 of the forward wall 90. At the opposite end of the disk 98 is an inwardly sloped surface 136 along the rearward wall 92. The mass of the disk 98 is sufficient to provide a gravitational force for sliding the forward end of the disk along the outwardly sloped surface 134, but contact of the rearward end 130 with the inwardly sloped surface 136 fixes the disk 98 in the illustrated position until the lowermost disk 96 has been removed from the opening of the pusher plate 114. Thus, when the pusher plate 114 is moved in the direction of arrows A to release the disk 96, the single line of contact at the rearward end 130 of the disk 98 is transferred to the upper surface of the pusher plate 114. When the pusher plate returns to the position of FIG. 3, the rearward end 130 of the disk 98 drops into the now empty disk-receiving opening of the pusher plate. The spacing provided by the inwardly sloped surface 136 permits the rearward end 130 of the disk to take a first downward step with the transfer of the line of contact from the disk 96 to the upper surface of the pusher plate 114 and permits a second downward step in which the disk 98 takes the position of the disk 96 after release of that lowermost disk 96. This two-step process is not critical, since the pusher plate 114 may be at the same height as the disks 96–104.

The vertical extent of the inwardly sloped surface 136 is preferably less than the vertical extent of the disk 98. This prevents the disk from prematurely entering the spacing provided by the inwardly sloped surface. A typical height of a 3.5-inch disk is 0.125 inch. For such a disk, the vertical height of the inwardly sloped surface 136 may be 0.1 inch.

While not critical, the outwardly sloped surface 134 may geometrically correspond to the inwardly sloped surface 136. The height may be 0.1 inch. This height is designed to ensure that the metal shutter of the lowermost disk 96 is spaced apart from the metal shutter of the next lowermost disk 98 as the pusher plate 114 is moved forwardly. The angle of the outwardly sloped surface 134 is designed to ensure a smooth travel of the forward end of the disk 98 along the sloped surface for deposit into the disk-receiving opening of the pusher plate 114. While not shown in FIG. 3, each stack of disks 96–104 within a hopper 14 will typically have a load member 40–50 described with reference to FIG. 1. The load member is positioned atop the stack to increase the gravitational force for moving a single disk into the disk-receiving opening of the pusher plate 114.

Figure 6:
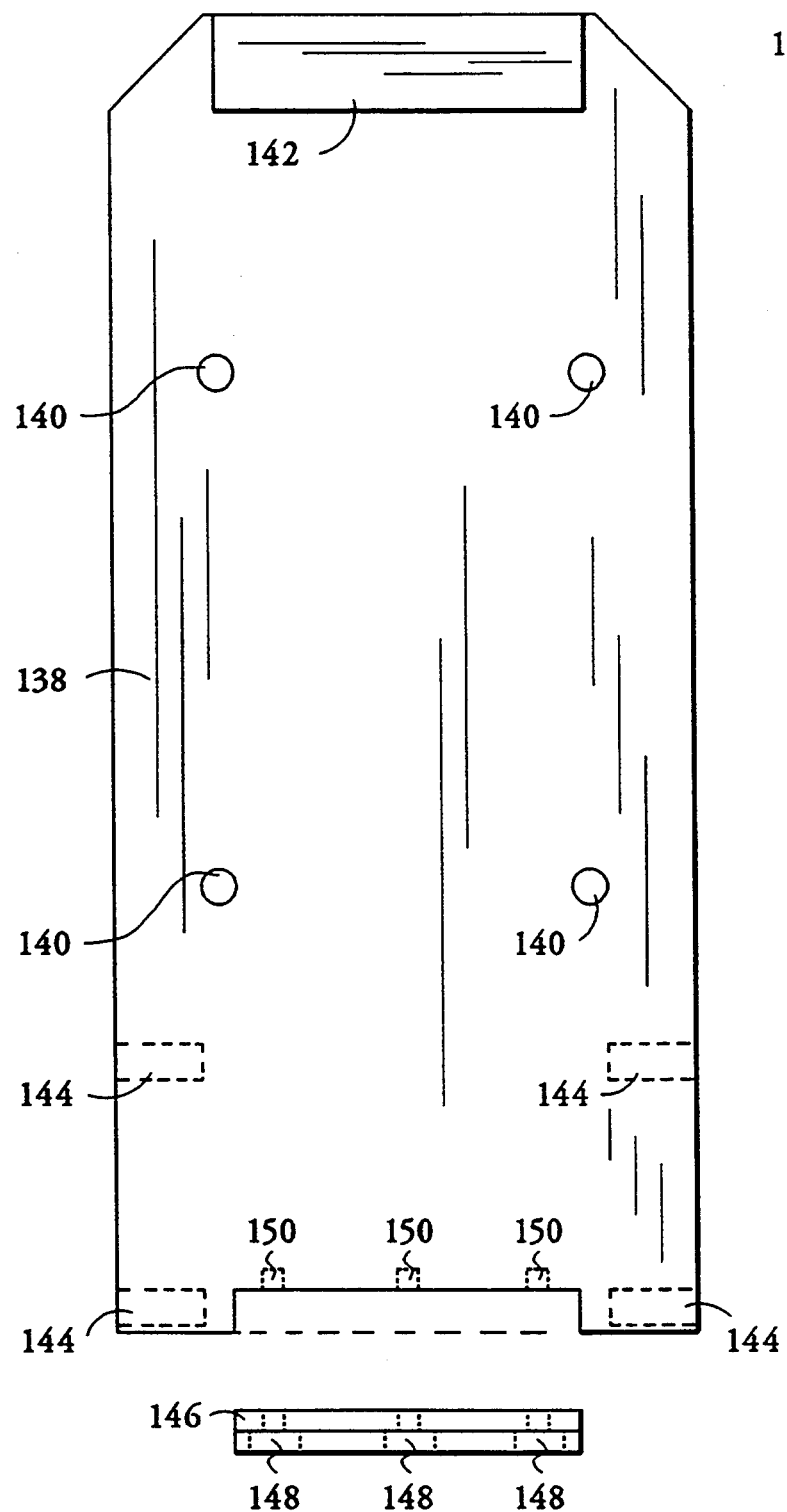
FIG. 6 is a rear view of a second embodiment of a front wall of the apparatus of FIG. 3.
Figure 7:
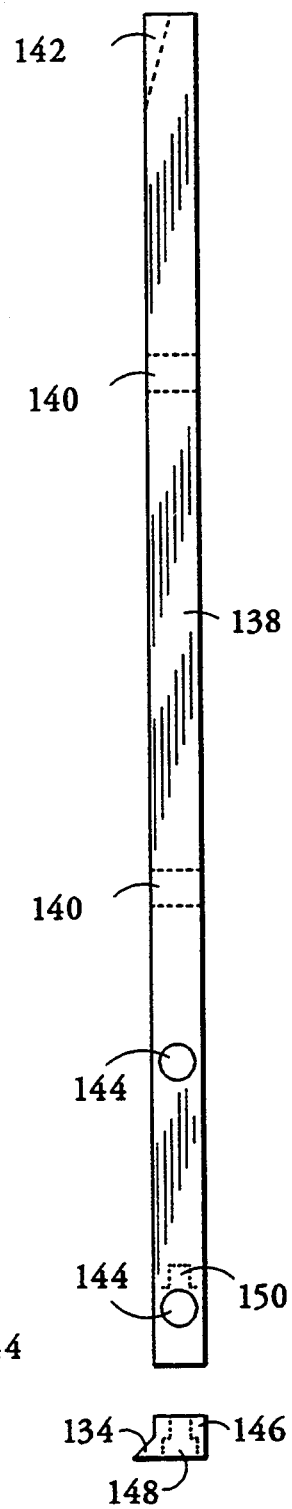
FIG. 7 is a side view of the wall of FIG. 6.

In FIG. 3 the outwardly sloped surface 134 is shown as being an integral part of the forward wall 90. Referring now to FIGS. 6 and 7, the forward wall of a hopper may comprise more than one part. A front plate 138 is shown as including four holes 140 that are used in attaching two parallel rails, not shown. The parallel rails extend horizontally and are spaced by a distance slightly greater than that of the disks which are to be inserted between the rails. The upper edge of the front plate 138 has an inclined surface 142 to aid in guiding the disks into the hopper. Side holes 144 may be internally threaded to receive screws for mounting the front plate to the remainder of the collating apparatus.

A disk-separation plate 146 that includes the outwardly sloped surface 134 is connected to the front plate 138 using screws or other fasteners, not shown. The screws pass through holes 148 in the disk-separation plate and are threaded into holes 150 in the front plate.

Figure 8:
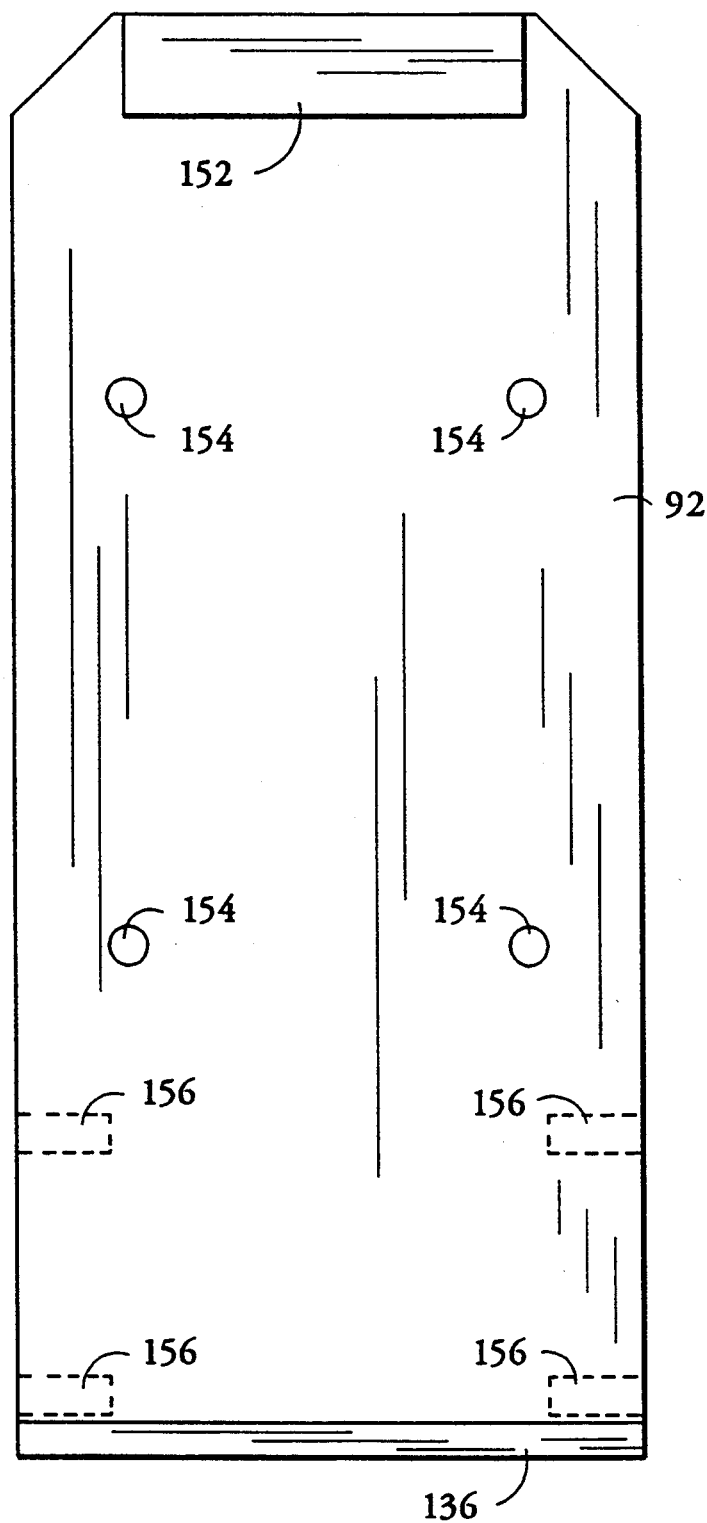
FIG. 8 is a front view of a rear wall of the apparatus of FIG. 3.
Figure 9:
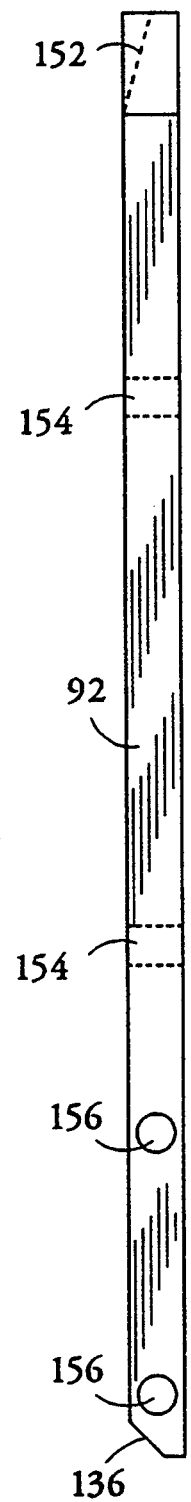
FIG. 9 is a side view of the wall of FIG. 8.

The rearward wall 92 of FIG. 3 is shown in greater detail in FIGS. 8 and 9. An inclined surface 152 at the top of the wall aids in the insertion of a stack of computer disks. Holes 154 are used to attach rails, not shown, that correspond to the rails of the forward wall. Internally-threaded holes 156 are employed to mount the wall 92 to the collating apparatus. The inwardly sloped surface 136 is shown as a chamfer of the rearward wall 92. However, in a manner similar to the manufacture of the forward wall, the rearward wall may include a separate piece that forms the inclined surface.

In operation, the collating apparatus 10 of FIG. 1 is pneumatically driven by pressure supplied by connecting a hose 128 to an in-house air supply. Optionally, the apparatus may include a compressor to remove dependence of the apparatus upon an exterior air supply. The first counter 72 is adjusted to indicate the number of disks within a set, and the second counter 74 is adjusted to indicate the number of sets to be collated.

Each disk stack 26–36 within the hoppers 14–24 is pressed downwardly by a load member 40–50. When the apparatus is started, the pusher plate slides a single disk from each of the six hoppers. The six computer disks are simultaneously deposited onto the endless conveyor belt 38. The conveyor belt moves the disks towards the stacker 12. Each disk slides down the tray 54 of the stacker and is inserted beneath the collated stack 56. As each disk 52 moves past the energy source 70, the energy path is interrupted and the first counter 72 is increased by one increment. When the count on the counter 72 reaches the preset number of disks within a set, the readout of the second counter 74 is increased by one and the readout of the first counter 72 is returned to "0". The apparatus will continue to operate until the readout of the second counter 74 reaches the preset number of sets to be collated.

The operation of a single hopper 14 may be described with reference to FIG. 3. A lowermost disk 96 is loaded within the pusher plate 114. The metal shutters of the disks 96 and 98 are separated because the outwardly sloped surface 134 rests the disk 98 at an angle to the loaded disk 96. When the pusher plate 114 is moved in the direction of arrows A, the line of contact at the rearward end 130 with the loaded disk 96 is transferred to a line of contact with the upper surface of the pusher plate 114. When the pusher plate releases the disk 98 through an opening in the stationary substrate 108, the pusher plate returns in an unloaded condition.

The unloaded pusher plate 114 is again brought to the rest position of FIG. 3, whereupon the next lowermost disk 98 is gravity fed into the disk-receiving opening of the pusher plate. The rearward end 130 of the disk 98 enters the opening of the pusher plate, providing clearance for the forward end to slide along the outwardly sloped surface 134 into the pusher plate. Each of the upper disks 100–104 then drops a level, with the disk 100 assuming the position of the disk 98 as shown in FIG. 3. The process will continue until the disks are unloaded from the hopper 14 or until the singularizing process is terminated.

While the present invention has been described as collating 3.5-inch disks, other computer disks may be sorted using the apparatus described above.

We claim:

1. An apparatus for sequentially releasing computer disks from a stack comprising,
   means for holding a stack of disks in a condition in which a next lowest disk exerts a gravitational force on a lowest disk,
   reciprocating means having a disk-receiving area for sliding the lowest disk from the means for holding, the reciprocating means having a rest position in which the disk-receiving area is aligned for gravitational feed thereinto of the next lowest disk from the means for holding, the reciprocating means having a delivery position, the disk-receiving area having a leading edge and a trailing edge with respect to travel of the reciprocating means from the rest position to the delivery position, and
   means for supporting the next lowest disk at an angle to the lowest disk such that contact of the next lowest disk with the lowest disk is along a line of contact, the next lowest disk defining a sloped plane, the line of contact being substantially the only contact between the two disks and being proximate to the trailing edge of the disk-receiving area when the reciprocating means is in the rest position, the slope of the sloped plane having a downward direction opposite to the direction traversed by the reciprocating means traveling from the rest position to the delivery position.

2. The apparatus of claim 1 wherein the reciprocating means is a pusher plate, the disk-receiving area being an opening in the pusher plate.

3. The apparatus of claim 1 wherein the means for supporting includes a first inclined surface positioned to support a first end of the next lowest disk, the first inclined surface and the first end being proximate to the leading edge of the disk-receiving area of the reciprocating means when the reciprocating means is in the rest position.

4. The apparatus of claim 3 wherein the means for supporting further includes a second inclined surface on a side of the means for supporting opposite to the first inclined surface, said first and second inclined surfaces being at approximately equal angles of inclination relative to the horizontal.

5. An apparatus for sequentially releasing computer disks from a stack comprising,
   hopper means for holding a generally vertical stack of computer disks, the hopper means having a fixed forward frame member and a fixed rearward frame member,
   a pusher member having a pickup position in which an opening in the pusher member is aligned with the hopper means to receive a single disk therefrom, the pusher member having a forward, disk-delivery position,
   release means for receiving the single disk from the opening when the pusher member is in the disk-delivery position,
   drive means for linearly sliding the pusher member forwardly to the disk-delivery position and rearwardly to the pickup position, and
   a fixed inclined surface extending rearwardly from the forward frame member to contact a next lowermost disk that is atop the single disk in the opening, the fixed inclined surface having a geometry to support a forward edge of the next lowermost disk such that the next lowermost disk is at an angle to the single disk and is supported only at forward and rearward edges of the next lowermost disk, wherein gravitational force causes the next lowermost disk to slide down the fixed inclined surface into the opening upon return of the pusher member from the disk-delivery position.

6. The apparatus of claim 5 further comprising an opening at the rearward frame member of the hopper means, the opening being opposite to the fixed inclined surface.

7. The apparatus of claim 6 wherein the opening at the rearward frame member has an angle corresponding to the angle of the fixed inclined surface.

8. The apparatus of claim 5 wherein the height of the inclined surface is less than 0.125 inch.

9. The apparatus of claim 5 wherein the pusher member is a plate, the opening being a cutaway region in the plate.

10. The apparatus of claim 9 wherein the plate has a height slightly less than the height of a disk to be received.

11. The apparatus of claim 5 further comprising a plurality of hopper means operatively associated with the pusher member to simultaneously deliver computer disks to the pusher member, each hopper means having a fixed inclined surface to support a forward edge of a computer disk above the pusher member.

12. An apparatus for sequentially releasing computer disks from a stack comprising,
a hopper,
a generally vertical stack of computer disks contained within the hopper, including a lowermost disk and a second lowermost disk,
a pusher means for sliding a disk from below the stack, the pusher means including a pickup area for receiving therein the lowermost disk when the pickup area is in alignment with the hopper,
means for sliding the pusher means in a forward direction for releasing the lowermost disk from the pickup area, and
a sloping stationary surface having a downward slope in a direction opposite to the forward direction, the stationary surface supporting a first end of the second lowermost disk, the second lowermost disk thereby being non-parallel to the lowermost disk, the second lowermost disk having a second end supported by the lowermost disk, the first end being forward of the second end with respect to the forward direction, wherein release of the lowermost disk from the area and realignment of the pickup area with the hopper slides the first end of the second lowermost disk along the sloping stationary surface in a direction opposite to the forward direction to a position in the pickup area.

13. The apparatus of claim 12 wherein the hopper includes opposed stationary front and rear walls, the sloping stationary surface projecting from the front wall into the stack.

14. The apparatus of claim 13 wherein the rear wall has a stationary inwardly sloped surface to allow passage of the second lowermost disk into the pickup area.

15. The apparatus of claim 14 wherein the pusher means is a plate and the pickup area is an opening through the plate.

16. The apparatus of claim 12 wherein the pickup area has length and width dimensions at least as great as the length and width dimensions of a 3.5 inch disk.

17. The apparatus of claim 14 wherein the inwardly sloped surface has a height less than the height of the second lowermost disk.

* * * * *